Patented Jan. 24, 1950

2,495,424

UNITED STATES PATENT OFFICE 2,495,424

PRODUCTION OF NITRO OLEFINS

Charles William Scaife, Norton-on-Tees, England, and Harold Baldock, deceased, late of Norton-on-Tees, England, by Herbert Baldock, legal representative, Hoylake, England, assignors to Imperial Chemical Industries Limited, a corporation of Great Britain No Drawing. Application October 22, 1945, Serial No. 623,848. In Great Britain November 27, 1944

6 Claims. (Cl. 260—644)

This invention relates to the production of nitro olefines.

According to the present invention there is provided a process for the production of nitro olefines from the dinitro derivatives of saturated aliphatic hydrocarbons containing at least two carbon atoms or of saturated alicyclic or saturated aliphatic-alicyclic hydrocarbons having at least five carbon atoms in the ring, in which the nitro groups are on adjacent carbon atoms at least one of which has an active hydrogen attached, or from the derivatives of said saturated hydrocarbons containing only nitro and nitrite groups, in which the nitro and nitrite groups are on adjacent carbon atoms of which the former has an active hydrogen attached, or crude reaction products containing one or more substances of these types, which comprises treating them with ammonia in the presence of a non-aqueous organic solvent for the nitro compound which does not react with the reactants or products, or with urea or other basic substance in the presence of a nonaqueous organic solvent for the nitro compound in which the urea or basic substance is soluble at least to some extent, and preferably freely so, and which does not react with the reactants or products. With a given solvent it is only possible to employ a base which is soluble at least to some extent in that solvent. The reaction should be carried out in the substantial absence of water, otherwise there is a tendency for the dinitro hydrocarbons and nitro-nitrite compounds to decompose, particularly when heat is employed.

The process of the invention is particularly applicable to dinitroparaffins, nitro-alkyl nitrites, alicyclic dinitroparaffins and nitro alicyclic nitrites, in all of which the number of carbon atoms and the groups are as specified in the last preceding paragraph.

There are three advantages connected with the use of ammonia in contradistinction to other bases: firstly, the reaction is very rapid; secondly, a further valuable product, ammonium nitrite, is simultaneously produced and can be readily separated as a solid by employing a solvent in which it is insoluble; and, thirdly, water is not formed in the reaction. The production of ammonium nitrite when ammonia is used as base forms a further valuable feature of the invention. Furthermore, it is possible to use a much wider range of solvents with ammonia, since it can be used as a gas and bubbled through the solution of the nitro compound. In some cases it may be desirable to employ the ammonia as anhydrous liquid ammonia or as a solution in the solvent. An advantage connected with the use of urea as base is that it gives simple decomposition products and the separation of the nitro olefins is therefore a simple matter.

The dinitro compounds in general give the nitro-olefins in good yield, but smaller yields are obtained with the nitro nitrite compounds except those containing about or more than eight carbon atoms. The reason for the smaller yields in the case of the lower nitro nitrite compounds appears to be that they readily decompose and yield nitro alcohols. The process as applied to the nitro nitrite compounds, which are themselves unstable, has the advantage that it provides a ready method of obtaining valuable compounds therefrom. The reaction is of greatest value in relation to nitro-hydrocarbons containing up to eight carbon atoms. When the nitro compound which is reacted contains two or three carbon atoms the resulting nitro olefin is obtained largely as the polymer.

In general any non-aqueous organic liquid which dissolves the nitro compound and does not react with the products or reactants may be used e. g. carbon tetrachloride or the type of solvent containing at least one ether group, but it is generally preferred to employ a low boiling solvent. When urea or other basic substances are used the solvent is preferably one in which they are freely soluble. While alcohols, for example, lower aliphatic mono-alcohols containing up to six carbon atoms, may be employed, it is preferred not to use them because they tend to react with the nitro-olefines formed and produce nitro ethers, and they also tend to react with the nitro/nitrite compounds to give nitro alcohols. Examples of suitable liquids are methylated ether, acetone, ethyl acetate and dioxan. All these may be used either with ammonia or urea, and all are suitable for use when ammonium nitrite is being produced since they are not solvents for it.

The general reaction may be carried out at temperatures up to the boiling point of the solvent, and may even be carried out at temperatures below 0° C. when ammonia is used. It may sometimes be desirable to carry out the reaction at pressures greater than atmospheric.

That form of the invention which uses ammonia is of particular value for the direct production of nitro olefines when applied to the product of the main reaction obtained according to the methods described in U. S. application Serial No. 594,602, now issued as Patent 2,472,550, and U. S. application Serial No. 594,603, now abandoned, which jointly disclose reacting nitrogen tetroxide with various aliphatic mono-olefines in the presence of a solvent such as methylated ether, thereby forming dinitro paraffins, nitro-alkyl nitrates, and nitro-alkyl nitrites, the latter then being hydrolyzed to nitro-alkyl alcohols by treatment with water or a lower aliphatic mono-alcohol, because it is unnecessary to separate the dinitro compounds present therein or to decompose the nitro/nitrite compounds by treatment of the said reaction product with water, but only necessary to pass dry ammonia gas through the solution of the reaction products or to dissolve it in a solvent and pass ammonia gas.

As already mentioned it is a subsidiary feature of the invention when ammonia is employed in the process, that there is obtained the additional valuable compound, ammonium nitrite. If, as is desirable, the solvent is one in which it is insoluble, the ammonium nitrite can be recovered by filtering it quickly off from the solution of the nitro olefine, and washing it free from nitro olefine with dry solvent. The ammonium nitrite can then be readily obtained in substantially pure condition by dissolving it in a suitable solvent, for example methanol, and re-precipitating by means of a liquid in which it is insoluble, for example, methylated ether. The process can be repeated to give ammonium nitrite of the desired degree of purity. The ammonium nitrite is extremely deliquescent and should not be left exposed to atmosphere.

The invention is illustrated but not limited by the following examples.

Example 1

30.8 gms. of 1,2-dinitro-2,4,4-trimethylpentane was dissolved in 260 ccs. of dry ether and dry ammonia gas was passed through the solution at 10° C. until no more ammonium nitrite formed. The last mentioned was rapidly filtered off, dissolved in water and freed from any occluded nitro olefine by extraction with ether.

The ether extract was dried and mixed with the original ether solution. The ether was removed from the mixture and the residue was distilled under reduced pressure to give 18.4 gms. of 1-nitro-2,4,4-trimethylpentene-1, that is a yield of 77%.

Example 2

53 gms. of 1,2-dinitro-isobutane was dissolved in dry ether and dry ammonia gas was passed through the solution at 10° C. Ammonium nitrite separated and was rapidly filtered off, dissolved in water and freed from any occluded nitro olefines by extraction with ether.

The ether extract was dried and mixed with the original ether solution. The ether was removed from the mixture and the residue was distilled under reduced pressure to give 30.1 gms. of α-nitroisobutene, that is a yield of 83%.

Example 3

Dry ammonia gas was passed through a reaction product maintained at 10° C., mainly comprising 1,2-dinitro-2,4,4-trimethylpentane and 1-nitro-2,4,4-trimethyl pentyl nitrite-2 and obtained according to the method disclosed in application No. 594,603 (except that it was not treated with water) by reacting 30 gms. of 2,4,4-trimethylpentene-1 with the equivalent of nitrogen tetroxide in dry methylated ether. Ammonium nitrite separated and was rapidly filtered, dissolved in water, and freed from any occluded nitro olefine by extraction with ether.

The ether extract was dried and mixed with the original ether solution. The ether was removed from the mixture and the residue was distilled under reduced pressure to give 33.5 gms. of 1-nitro 2,4,4-trimethylpentene-1, that is a yield of 79.7% on the 2,4,4-trimethylpentene-1.

Example 4

Dry ammonia gas was passed through a mixture containing 1,2-dinitro-isobutane and nitrotertiary butyl nitrite at 10° C. obtained according to the method disclosed in application No. 594,602 (except that it was not treated with water) by reacting 53 gms. of isobutene with the equivalent of nitrogen tetroxide in methylated ether. Ammonium nitrite separated and was rapidly filtered, dissolved in water and freed from any occluded nitro olefine by extraction with ether.

The ether extract was dried and mixed with the original ether solution. The residual oil obtained on removing the ether from the mixture was washed with water, dried and distilled under reduced pressure to give 48.2 gms. of α-nitroisobutene, that is a yield of 50.4% on the isobutene. Some nitrotertiary butanol was also obtained.

Example 5

30 gms. of 1,2-dinitro-isobutane and 12 gms. of urea in 250 ccs. of dry ether were heated together under reflux on the water bath at 50° C. until no more gas was evolved. The ether solution was filtered off, dried with anhydrous sodium sulphate to remove water formed in the reaction, and then distilled under reduced pressure to give 14.4 gms. of α-nitroisobutene.

Example 6

A reaction product mainly comprising 1,2-dinitro-2,4,4-trimethylpentane and 1-nitro-2,4,4-trimethylpentyl nitrite-2 and dioxan obtained according to the method disclosed in application No. 594,603 (except that it was not treated with water) by reacting 66 gms. of 2,4,4-trimethylpentene-1 with the equivalent of nitrogen tetroxide in dry dioxan, was stirred with 53 gms. of urea at room temperature for ¼ hr. and the whole was then heated at 95–100° for 4 hours. The dioxan was filtered off and then distilled under reduced pressure to give 71.7 gms. of 1-nitro-2,4,4-trimethylpentene-1.

What is claimed is:

1. A process for the production of nitro olefines which comprises reacting a saturated aliphatic nitro hydrocarbon of 2 to 8 carbon atoms having the formula selected from the group consisting of:

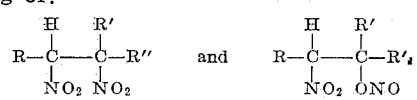

wherein R, R' and R'' are members selected from the group consisting of hydrogen and alkyl radicals, with a basic substance selected from the group consisting of ammonia and urea under substantially anhydrous conditions in the presence of an inert organic solvent for said nitro hydrocarbon.

2. A process for the production of nitro olefines which comprises reacting a saturated dinitro aliphatic hydrocarbon of from 2 to 8 carbon atoms, wherein the nitro groups are on adjacent carbon atoms, at least one of said carbon atoms also containing a hydrogen atom attached thereto, with a basic substance selected from the group consisting of ammonia and urea under substantially anhydrous conditions in the presence of an inert organic solvent for said nitro hydrocarbon.

3. A process for the production of nitro olefines which comprises reacting a saturated nitro-nitrite aliphatic hydrocarbon of from 2 to 8 carbon atoms, wherein the nitrogen-oxygen groups are on adjacent carbon atoms, the carbon atom containing the nitro group having a hydrogen atom attached thereto, with a basic substance selected from the group consisting of ammonia and urea under substantially anhydrous conditions in the presence of an inert organic solvent for said nitro hydrocarbon.

4. A process as claimed in claim 1 wherein said inert organic solvent is dioxan.

5. A process as claimed in claim 1 wherein said basic substance is ammonia.

6. A process as claimed in claim 2 wherein said dinitro compound is 1,2-dinitro-2,4,4-trimethylpentane.

CHARLES WILLIAM SCAIFE.
HERBERT BALDOCK,
*Legal Representative of the Estate of Harold Baldock, Deceased.*

REFERENCES CITED

The following references are of record in the file of this patent:

UNITED STATES PATENTS

| Number | Name | Date |
|---|---|---|
| 2,257,980 | Schwarz et al. | Oct. 7, 1941 |
| 2,414,594 | Gold | Jan. 21, 1947 |
| 2,417,380 | Smith et al. | Mar. 11, 1947 |

OTHER REFERENCES

Wieland et al., Ber. deutsch. Chem. Ges., 53, 201–210 (1920).

Michael et al., J. Org. Chem. 4, 169–197 (1939).